United States Patent
Masse et al.

(10) Patent No.: US 7,623,579 B2
(45) Date of Patent: Nov. 24, 2009

(54) METHOD OF DEMODULATING OFDM TYPE SIGNALS IN THE PRESENCE OF STRONG CO-CHANNEL INTERFERENCE SIGNALS

(75) Inventors: Denis Masse, Rosselange (FR); François Pipon, Paris (FR); Rym Mhiri, Paris (FR)

(73) Assignees: Thales, Neuilly sur Seine (FR); TDF, Paris (FR)

( * ) Notice: Subject to any disclaimer, the term of this patent is extended or adjusted under 35 U.S.C. 154(b) by 519 days.

(21) Appl. No.: 10/554,420

(22) PCT Filed: Apr. 16, 2004

(86) PCT No.: PCT/EP2004/050558

§ 371 (c)(1),
(2), (4) Date: Sep. 27, 2006

(87) PCT Pub. No.: WO2004/098140

PCT Pub. Date: Nov. 11, 2004

(65) Prior Publication Data

US 2007/0058733 A1 Mar. 15, 2007

(30) Foreign Application Priority Data

Apr. 25, 2003 (FR) ................................. 03 05124

(51) Int. Cl.
*H04K 1/10* (2006.01)
(52) U.S. Cl. ............... 375/260; 375/267; 375/347; 375/346; 370/203
(58) Field of Classification Search ............... 375/347, 375/346, 354; 370/334, 329; 342/440; 455/423
See application file for complete search history.

(56) References Cited

U.S. PATENT DOCUMENTS

| 5,886,988 | A | * | 3/1999 | Yun et al. ................. 370/329 |
| 6,144,711 | A | * | 11/2000 | Raleigh et al. ............. 375/347 |
| 6,239,746 | B1 | * | 5/2001 | Pipon et al. ................ 342/440 |
| 6,335,954 | B1 | * | 1/2002 | Bottomley et al. .......... 375/354 |

(Continued)

FOREIGN PATENT DOCUMENTS

FR 2715488 A1 7/1995

(Continued)

OTHER PUBLICATIONS

Mhiri R et al: "Synchronization for a DVB-T received in presence of strong interference" 1st Mobile and Wireless Telecommunications Summit 2002, Jun. 17, 2002 pp. 338-342 XP002269280 Thessaloniki, Greece.

(Continued)

*Primary Examiner*—Sudhanshu C Pathak
(74) *Attorney, Agent, or Firm*—Lowe Hauptman Ham & Berner, LLP

(57) ABSTRACT

A method of demodulating a signal in a transmission system where the modulation includes several substantially orthogonal subcarriers, and the vector of the propagation channel H[n,k] is known or the received signal includes at least pilot symbols emitting reference data. The method includes at least one step of estimating the symbol a[n,k] emitted on the $k^{th}$ subcarrier of the $n^{th}$ symbol of the modulation using a recombination step weighting the various signals received after synchronization and demodulation x[n,k].

11 Claims, 2 Drawing Sheets

U.S. PATENT DOCUMENTS

Figure 1:
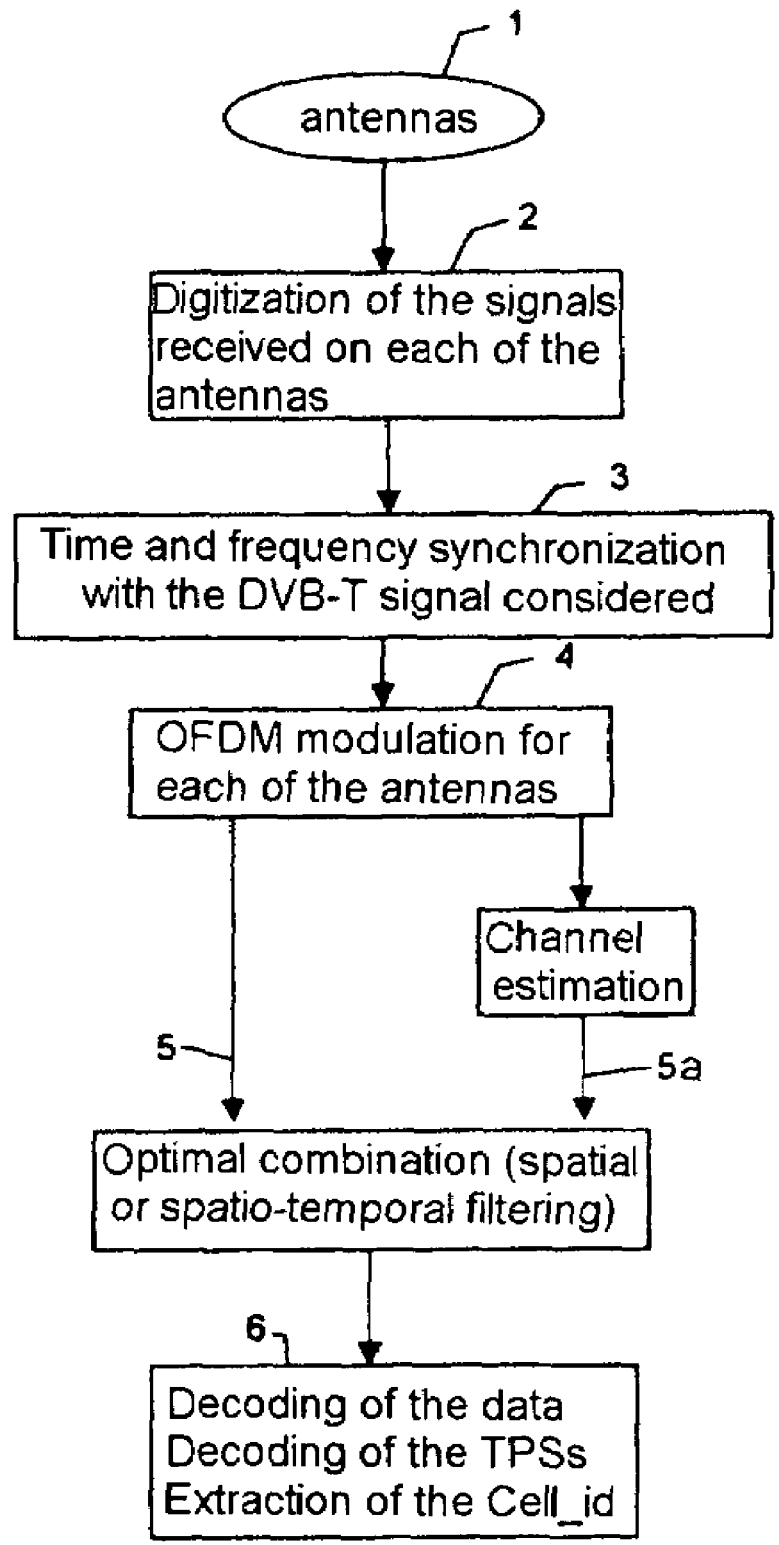

| | | | |
|---|---|---|---|
| 6,349,207 B1 * | 2/2002 | Monot et al. | 455/423 |
| 6,377,636 B1 * | 4/2002 | Paulraj et al. | 375/346 |
| 2002/0105928 A1 * | 8/2002 | Kapoor et al. | 370/334 |

FOREIGN PATENT DOCUMENTS

| | | |
|---|---|---|
| FR | 2766320 A1 | 1/1999 |
| FR | 2 180175 A | 12/2001 |
| FR | 2810175 A1 | 12/2001 |

OTHER PUBLICATIONS

Mhiri R et al: "Synchronization for a DVB-T receiver in presence of strong interference" IST Mobile and Wireless Telecommunications Summit 2002, Jun. 17, 2002; pp. 338-342; XP002269280; Thessaloniki, Greece, ISBN: 960-91918-0-0.

* cited by examiner

METHOD OF DEMODULATING OFDM TYPE SIGNALS IN THE PRESENCE OF STRONG CO-CHANNEL INTERFERENCE SIGNALS

The invention relates to a method of demodulating OFDM-type signals (Orthogonal Frequency Division Multiplexing) in the presence of strong co-channel interference signals, that is to say for a C/I ratio (signal to interference ratio) of up to −20 dB.

It applies in particular to Land Digital Television (TDT) or DVB-T (Digital Video Broadcasting-Terrestrial, described in standard ETSI EN 300 744, European Television Standard).

In a more general manner it may be used in any transmission system using modulation where the subcarriers are orthogonal, for example an OFDM modulation.

Several European countries are currently planning the rollout of their DVB-T (Digital Video Broadcasting-Terrestrial) networks for the near future. Some countries have already rolled it out and have begun commercial exploitation thereof. A foreseeable densification of these networks over the years to come looks likely to give rise to interference problems which will disrupt DVB-T reception. This is why it turns out to be necessary for broadcasters to possess an effective tool making it possible to detect and identify all the DVB-T transmitters whose signals are present at a measurement point and at a given frequency.

Patents FR 2 715 488 and FR 2 766 320 describe a tool for analysing and identifying co-channel interference in GSM type communications. The methods taught make it possible to demodulate a GSM signal in the presence of strong co-channel interference signals. The processing implemented in this tool calls upon antenna processing techniques making it possible to carry out spatial filterings.

Certain DVB-T receivers also use antenna processing which makes it possible to harness spatial diversity so as to improve the performance for mobile reception and to combat the effects of fading. These receivers are generally based on the techniques of "Selection Combining" (SC) or of "Maximum Ratio Combining" (MRC).

Finally, it is moreover known to those in the field that spatial or spatial-temporal filters allow the rejection of co-channel interferers. For example:

the spatial filter matched to a reference sequence included in the signal transmitted is $g[n]=R_{xx}^{-1}[n].r_{xa}[n]$, the spatial filter obtained by minimizing the square error (MMSE standing for Minimum Mean Square Error) is $g[f]=R_{xx}^{-1}[f].H[f]$, the spatio-temporal matched filter (STMF standing for Space-Time Matched Filter) is $g[f]=R_{=}^{-1}[f].H[f]$, where n is the index of the OFDM symbol (temporal dimension), $R_{xx}[n]$ corresponds to the correlation matrix of the signal to be spatially filtered, $H[f]$ the vector representative of the propagation channel and $R_{zz}[f]$ corresponds to the correlation matrix of the contribution of the reception noise and of the interference in the signal received (that is to say the contribution of everything that is not the useful signal).

Although such techniques turn out to be effective, they nevertheless have certain limits.

The technique developed in the aforementioned patents is aimed at GSM type signals. It does not offer the same performance when it is applied to a digital television signal whose characteristics are very different than those of the GSM signal (DVB-T signal: bandwidth from 6 MHz to 8 MHz and OFDM modulation; GSM signal: bandwidth of 300 kHz and GMSK modulation).

The antenna processing used in certain DVB-T receivers is matched to combat the effects of fading so as to improve performance for mobile reception. This processing is no longer effective in the presence of strong co-channel interferers.

The idea of the invention is notably to be able to demodulate a DVB-T signal in the presence of strong co-channel interference signals by using a multisensor receiver and appropriate antenna processing techniques.

The invention relates to a method of demodulating a signal in a transmission system where the modulation includes several substantially orthogonal subcarriers, the vector of the propagation channel H[n,k] being known, or the received signal including at least pilot symbols transmitting reference data. It is characterized in that it includes at least one step of estimating the symbol a[n,k] emitted on the $k^{th}$ subcarrier of the $n^{th}$ symbol of the modulation with the aid of a recombination step weighting the various signals received x[n,k] after synchronization and demodulation.

The recombination step uses, for example, a recombination vector defined by the relation $$g[n]=R_{xx}^{-1}[n].r_{xa}[n] \qquad (3)$$

and the estimation of the correlation matrix and of the inter-correlation vector is performed using the following formulae:

$$\hat{R}_{xx}[n] = \sum_{l=-L_1}^{L_2}\left(\sum_{k \in K_l} x[n+l,k]x^H[n+l,k]\right) \qquad (4)$$

$$\hat{r}_{xa}[n] = \sum_{l=-L_1}^{L_2}\left(\sum_{k \in K_l} x[n+l,k]a^*[k]\right) \qquad (5)$$

where:

the index l consists in using the symbols of the modulation before and after the symbol considered so as to improve the estimation of the correlation matrix, $K_l$ is the set of indices of the continuous pilots and/or of the dispersed pilots.

It may comprise a step of splitting the global band of the signal into m subbands and a step in which the recombination vector is determined for each subband.

The following formulae may be used to estimate the correlation Matrix:

$$\hat{R}_{xx}[n,m] = \sum_{l=-L_1}^{L_2}\left(\sum_{k \in K_{l,m}} x[n+l,k]x^H[n+l,k]\right) \qquad (4)a$$

$$\hat{r}_{xa}[n,m] = \sum_{l=-L_1}^{L_2}\left(\sum_{k \in K_{l,m}} x[n+l,k]a^*[k]\right) \qquad (5)a$$

where $K_{l,m}$ represents the set of indices of the continuous pilots and/or of the dispersed pilots of subband m.

The invention also relates to a method of demodulating a signal in a transmission system where the modulation includes several substantially orthogonal subcarriers, the received signal including at least pilot symbols transmitting reference data. It is characterized in that:

It comprises a step of estimating the vector of the propagation channel H[n, k], it comprises at least one step of estimating the symbol a[n,k] emitted on the $k^{th}$ subcarrier of the $n^{th}$ symbol of the modulation with the aid of a recombination step weighting the various signals received x[n,k] after synchronization and demodulation, the recombination step uses a recombination vector defined by the relation $$g[n]=R_{xx}^{-1}[n].H[n,k] \quad (8)$$

the estimation of the correlation matrix and of the intercorrelation vector is performed using the following formulae:

$$\hat{R}_{xx}[n] = \sum_{l=-L_1}^{L_2} \left( \sum_{k \in K_l} x[n+l, k] x^H[n+l, k] \right) \quad (4)$$

$$\hat{r}_{xa}[n] = \sum_{l=-L_1}^{L_2} \left( \sum_{k \in K_l} x[n+l, k] a^*[k] \right) \quad (5)$$

where:

the index l corresponds to the use of the symbols of the modulation before and after the symbol considered so as to improve the estimation of the correlation matrix, $K_l$ is the set of indices of the continuous pilots and/or of the dispersed pilots.

It may comprise a step of splitting the global band of the signal into m subbands and in that the recombination vector is determined for each subband.

The following formulae are used to estimate the correlation matrix:

$$\hat{R}_{xx}[n, m] = \sum_{l=-L_1}^{L_2} \left( \sum_{k \in K_{l,m}} x[n+l, k] x^H[n+l, k] \right) \quad (4)a$$

$$\hat{r}_{xa}[n, m] = \sum_{l=-L_1}^{L_2} \left( \sum_{k \in K_{l,m}} x[n+l, k] a^*[k] \right) \quad (5)a$$

where $K_{l,m}$ represents the set of indices of the continuous pilots and/or of the dispersed pilots of the subband m.

The estimated correlation matrix is, for example, the correlation matrix of the Gaussian white noise and of the interference signals $R_{zz}[n,k]$.

The modulation may be a modulation of OFDM type.

The signal is a DVB-T signal and the TPS pilot symbols are estimated.

The method may comprise at least the following steps:
demodulating in a differential manner:

$$\tilde{a}_{dif}[n,k] = \tilde{a}[n+1,k].\tilde{a}^*[n,k], \quad (13)$$

using the frequency diversity:

$$\tilde{a}_{dif\_all}[n] = \sum_{k \in T} \tilde{a}_{dif}[n, k], \quad (14)$$

applying a decision criterion to obtain the TPS bit.

$$b[n] = \begin{cases} 1, & \Re\{\tilde{a}_{dif\_all}[n]\} \geq 0, \\ -1, & \Re\{\tilde{a}_{dif\_all}[n]\} < 0, \end{cases}$$

It may comprises at least the following steps:
using the frequency diversity:

$$\tilde{a}[n] = \sum_{k \in T} \frac{\tilde{a}[n, k]}{w_k},$$

applying a decision criterion:

$$\hat{a}[n] = \begin{cases} 1, & \Re\{\tilde{a}[n]\} \geq 0, \\ -1, & \Re\{\tilde{a}[n]\} < 0, \end{cases}$$

demodulating in a differential manner to obtain the TPS bit: b[n]=â[n+1] â[n]

The method according to the invention advantageously makes it possible in the exemplary application to a DVB-T signal:

to demodulate a DVB-T signal in the presence of strong co-channel interference signals and pilots included in the DVB-T signal, to identify the DVB-T signals present at a measurement point and at a given frequency by extracting the field Cell_id from the TPS bits, to analyse and identify interferers for DVB-T, hence to offer an effective tool making it possible to detect and identify the DVB-T transmitters whose signals are present at a measurement point and at a given frequency.

Figure 2:
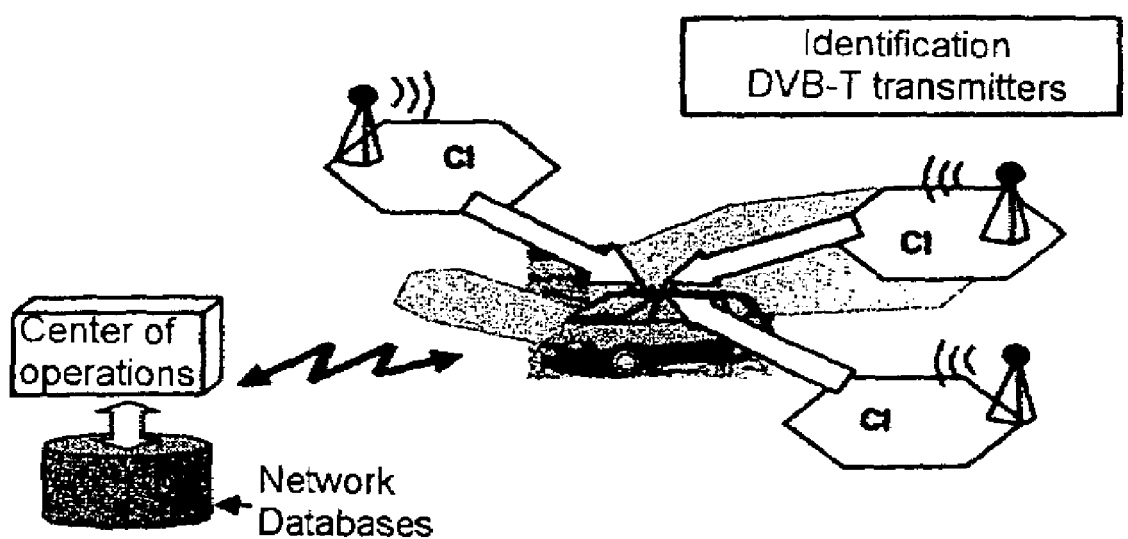

Other features and advantages of the invention shall appear more clearly from the following description of an exemplary embodiment given by way of an illustration that in no way limits the scope of the invention and from the appended figures, of which:

FIG. 1 a diagram of the steps implemented in a multisensor receiver,

FIG. 2 an exemplary application of the method according to the invention.

In order to better understand the method according to the invention, the example which follows is given by way of an illustration that in no way limits the scope of the invention in respect of the demodulation of TPS pilots of a DVB-T signal and in respect of the extraction of the field Cell_id contained in these pilots. In this way, the method detects and identifies all the DVB-T transmitters whose signals are present at a measurement point and at a given frequency.

The invention applies also to any OFDM signal provided that known pilots are included and/or that the propagation channel can be estimated.

Before detailing the steps of the method according to the invention a few characteristics regarding the DVB-T signal detailed in standard ETSI EN 300 744 are recalled.

A DVB-T signal is an OFDM signal. The number of carriers making up this signal may be 6817 (8K mode, obtained with the aid of an FFT on 8192 points) or 1705 (2K mode, obtained with the aid of an FFT on 2048 points).

The various subcarriers serve to transport data or are used as pilots.

The types of pilot are 3 in number:

The continuous pilots and the dispersed pilots which transmit reference data. These reference data as well as the position of these pilots are known to the receiver. These pilots serve to enable the receiver to synchronize itself and to estimate the channel.

The signalling pilots called TPS pilots. During a given OFDM symbol, all the TPS pilots transmit the same logic bit coded differentially. The signaling data are organized in blocks of 68 bits comprising in particular a field called Cell_id, making it possible to identify the cell of origin of the signal.

FIG. 1 diagrammatically shows an example of steps of the method according to the invention, executed within a multisensor DVB-T receiver. This receiver comprises for example at least 2 reception antennas and a processor suitable for handling steps 2, 3, 4, 5, 6, and 7 referenced in FIG. 1.

Step 1

The signal is received on the network of antennas.

Steps 2, 3, and 4

The method digitizes the signals received on the various antennas according to a procedure known to the person skilled in the art (step 2). On completion of this digitization step the signals are synchronized in time and in frequency with the DVB-T signal considered (step 3). The synchronized signals are thereafter demodulated by applying for example an FFT (Fast Fourier Transform) of the useful part of the OFDM symbols for each of the antennas (step 4).

Steps 5 or 5a

On completion of steps 2, 3, and 4, the signal received (digitized signal, synchronized with the DVB-T signal considered and OFDM demodulated) may be written:

$$x[n,k]=H[n,k].a[n,k]+z[n,k] \quad (1)$$ where n represents the index of the OFDM signal (temporal dimension), k represents the index of the subcarrier (frequency dimension), $x[n,k]=\{x_1[n,k], x_2[n,k] \ldots\}$ is the vector made up of the signals received on each of the antennas, after synchronization and OFDM modulation, $H[n,k]=\{H_1[n,k], H_2[n,k] \ldots\}$ is the vector representative of the propagation channel, $a[n,k]$ is the symbol emitted on the $k^{th}$ subcarrier of the $n^{th}$ OFDM symbol, $z[n,k]$ is the vector representing the contribution of the additive white Gaussian noise and of the co-channel interferers.

The method according to the invention makes it possible to obtain a reliable estimate $\tilde{a}[n,k]$ of the symbol $a[n,k]$ (that is to say making it possible to recover the data transmitted) even in the presence of a strong co-channel interference signal, for example for a C/I ratio (signal to interferer ratio) of up to −20 dB.

When one is more specifically interested in the continuous and dispersed pilots, it is known that for a given pilot the same data item transmitted at each OFDM symbol (in fact every 4 OFDM symbols for the dispersed pilots) and therefore $a[n,k]=a[k]$ (the data item transmitted depends only on the index of the pilot and it is known to the receiver).

When one is more specifically interested in the TPS signalling pilots, it is known that during an OFDM symbol each TPS pilot transmits the same logic data item code differentially. In this case, $a[n,k]$ may be written $w_k.a[n]$ where wk is a pseudorandom sequence, described in standard ETSI EN 300 744 and known to the receiver.

Steps 5 or 5a have in particular the function of estimating $a[n,k]$. This estimation is carried out with the aid of a recombination weighting the signals received at the level of the various antennas of the receiver, after synchronization and OFDM modulation. The estimation is represented by the formula:

$$\tilde{a}[n,k]=g^H[n,k].x[n,k] \quad (2)$$

where $g[n,k]$ is the recombination vector and $^H$ is the conjugate-transpose operator. This recombination operation carries out a spatial or spatio-temporal filtering, and it is advisable to properly choose the value of the recombination vector, that is to say the various weighting coefficients. When the recombination vector is independent of frequency ($g[n,k]=g[n]$), the filtering of the signals is a spatial filtering. When this vector depends on frequency, the filtering of the signals is a spatial-temporal filtering, consisting of a spatial filtering on each of the frequencies of the reception band.

A few exemplary structures making it possible to calculate the recombination vector to be used are given hereinbelow by way of wholly nonlimiting illustration.

Step 5

Recombination Vector not Requiring the Propagation Channel to Have Been Estimated (MMSEC1)

It is well known that the spatial filter matched to a reference sequence d[n] included in the signal, that is to say the spatial filter minimizing the square error between its output and the reference sequence, is $$g[n]=R_{xx}^{-1}[n].r_{xd}[n] \quad (3)$$ where $R_{xx}[n]$ is the correlation matrix of the signal to be spatially filtered, $r_{xd}[n]$ is the vector of intercorrelation between the signal to be spatially filtered and the reference sequence.

The use of such a recombination vector requires in particular:

the existence of a reference sequence, the estimation of the correlation matrix of the signal to be spatially filtered as well as the estimation of the vector of intercorrelation between the signal to be filtered and the reference sequence.

The method according to the invention considers in particular that the reference sequence consists of the symbols $a[n,k]$ transmitted on the continuous pilots and/or the dispersed pilots The vector considered is the signal vector obtained at each of the frequencies.

The estimation of the correlation matrix and the estimation of the intercorrelation vector are then performed using respectively the following formulae:

$$\hat{R}_{xx}[n] = \sum_{l=-L_1}^{L_2} \left( \sum_{k \in K_l} x[n+l,k]x^H[n+l,k] \right) \quad (4)$$

$$\hat{r}_{xa}[n] = \sum_{l=-L_1}^{L_2} \left( \sum_{k \in K_l} x[n+l,k]a^*[k] \right) \quad (5)$$

where:

the index l is an index making it possible to use the OFDM symbols before (L1 symbols before) and after (L2 symbols after) the symbol considered so as to improve the estimation of the correlation matrix, K$_l$ is the set of indices of the continuous pilots and/or of the dispersed pilots.

A variant embodiment which makes it possible to improve the estimation of the correlation matrix R$_x$[n] consists for example in performing the sum over all the subcarriers, and not only over the continuous and/or dispersed pilots. This improvement is applied to estimate R$_x$[n] through the following formula:

$$\hat{R}_{xx}[n] = \sum_{l=-L_1}^{L_2} \left( \sum_{k \in K} x[n+l, k] x^H[n+l, k] \right) \quad (6)$$

where K is the set of indices of all the subcarriers.

Regardless of which formula is used to estimate R$_{xx}$[n], the recombination vector obtained depends solely on the OFDM symbol considered n, and not on the subcarrier considered.

We therefore have $g_{MMSEC1}[n,k] = g[n] = \hat{R}_{xx}^{-1}[n] \cdot \hat{r}_{xa}[n]$. (7)

The filtering carried out by this structure is a spatial filtering, and its performance is limited when the noise (that is to say the reception noise+the interfering signals) is not temporally white (the interfering signals comprise propagation multipaths). One way of improving the performance consists in implementing a spatio-temporal filtering of the signals. Thus, in order to improve the rejection of interferers, the method comprises, for example, a step making it possible to split the global band of the signal into subbands. Each subband has a width preferably less than the coherence band of the channel. For each of these subbands, the method then calculates the recombination vector as was indicated hereinabove, that is to say by estimating R$_{xx}$[n] and r$_{xa}$[n] through formulae (4) and (5), with K$_l$ representing in this case the indices of the continuous and/or dispersed pilots included in the subband considered. By introducing an index m representing the subband, formulae (3), (4), and (5) become:

$$g[n, m] = R_{xx}^{-1}[n, m] r_{xd}[n, m] \quad (3)a$$

$$\hat{R}_{xx}[n, m] = \sum_{l=-L_1}^{L_2} \left( \sum_{k \in K_{l,m}} x[n+l, k] x^H[n+l, k] \right) \quad (4)a$$

$$\hat{r}_{xa}[n, m] = \sum_{l=-L_1}^{L_2} \left( \sum_{k \in K_{l,m}} x[n+l, k] a^*[k] \right) \quad (5)a$$

where K$_{l,m}$ represents the set of indices of the continuous pilots and/or of the dispersed pilots of subband m.

As previously, the correlation matrix R$_{xx}$ may be estimated using all the subcarriers through the formula:

$$\hat{R}_{xx}[n, m] = \sum_{l=-L_1}^{L_2} \left( \sum_{k \in K_m} x[n+l, k] x^H[n+l, k] \right) \quad (6)$$

where K$_m$ is the set of indices and the subcarriers of subband m.

We thus obtain a recombination vector per subband considered, which is for example used to estimate â[n,k] for each of the subcarriers included in the subband. This splitting into subbands corresponds to a transformation of the purely spatial filtering into a spatio-temporal filtering, thereby very markedly improving the effectiveness of the method. The propagation channel is considered to be constant in this implementational variant.

Step 5a

Recombination Vector Requiring the Propagation Channel to have Been Estimated (MMSEC2)

In this variant embodiment, the method consists for example in using a spatial filter obtained by minimizing the square error (MMSE) which is $g[f] = R_{xx}^{-1}[f] \cdot H[f]$ (7).

For the OFDM signal used in the exemplary application the relation (7) becomes $g[n,k] = R_{xx}^{-1}[n,k] \cdot H[n,k]$ (8).

The method assumes that the channel vector H[n,k] has been estimated according to a procedure known to the person skilled in the art (for example as described in the article "TCM on frequency-selective land-mobile fading channels" by Peter Höher, Proc. Tirrenia Int. Workshop Digital Commun, Tirrenia, Italy, September 1991).

The method estimates the correlation matrix R$_{xx}$[n,k] as was indicated hereinabove, i.e. through one of the following two formulae:

$$\hat{R}_{xx}[n] = \sum_{l=-L_1}^{L_2} \left( \sum_{k \in K_l} x[n+l, k] x^H[n+l, k] \right) \quad (4)$$

or $$\hat{R}_{xx}[n] = \sum_{l=-L_1}^{L_2} \left( \sum_{k \in K} x[n+l, k] x^H[n+l, k] \right) \quad (6)$$

It is assumed in fact, in these formulae, that the correlation matrix does not depend on the carrier, hence the fact of reducing R$_{xx}$[n,k] to R$_{xx}$[n].

As previously, the total band may also be split into subbands whose width is chosen to be preferably less than the width of the coherence band of the transmission channel, and it is then possible to estimate a correlation matrix for each of these subbands with the aid of one of the following two formulae:

$$\hat{R}_{xx}[n, m] = \sum_{l=-L_1}^{L_2} \left( \sum_{k \in K_{l,m}} x[n+l, k] x^H[n+l, k] \right) \quad (4)$$

ou $$\hat{R}_{xx}[n, m] = \sum_{l=-L_1}^{L_2} \left( \sum_{k \in K_m} x[n+l, k] x^H[n+l, k] \right) \quad (6)$$

The method thus makes it possible to calculate a recombination vector for each of the subcarriers of the OFDM signal so as to estimate the data item a[n,k] received on each of the subcarriers. The channel may be variable in the subband.

Space-Time Matched Filter (STMF)

According to another variant embodiment, the method uses a matched spatio-temporal filter which is expressed for the OFDM signal through the relation g[n,k]=R$_=^{-1}$[n,k].H[n,k] (9)

According to this variant, the method comprises a step of estimating the correlation matrix of the Gaussian white noise and of the interference signals R$_{zz}$[n,k].

To do this, the method estimates the contribution of the noise to the indices of the continuous and/or dispersed pilots through the formula ẑ[n,k]=x[n,k]−Ĥ[n,k].a[n,k] (10). Let us recall that, for these pilots, a[n,k] is known (since the values of a[n,k] at these pilots are fixed by the DVB-T ETSI EN 300 744 standard), and that it is assumed that the channel has been estimated by a technique known to the person skilled in the art (it is for example possible to refer to the article "TCM on frequency-selective land-mobile fading channels" by Peter Höher, Proc. Tirrenia Int. Workshop Digital Commun, Tirrenia, Italy, September 1991).

The method then estimates the correlation matrix R$_{zz}$[n,k] according to the procedure indicated previously for the matrix R$_{xx}$[n,k] by replacing x[n,k] with z[n,k].

Step 6: Application of the Method According to the Invention to the Demodulation of the TPS Bits of a DVB-T Signal The variant embodiments described hereinabove make it possible for example to demodulate the TPS bits of a DVB-T signal even in the presence of a strong co-channel interference signal (up to 20 dB stronger than the DVB-T signal considered, or even more). To do this:

The previous technique makes it possible to recover the estimated symbols a[n,k] for the indices k corresponding to the indices of the TPS pilots, During a given OFDM symbol, as each TPS pilot transports the same logic bit modulated differentially, the method then uses this frequency diversity and carries out the differential demodulation to obtain the TPS data bit transmitted during the OFDM symbol considered. Various ways of implementing the method according to the invention are possible, for example:

either carry out the differential demodulation before using the frequency diversity. In this case, we have:

$$\tilde{a}_{dif}[n,k]=\tilde{a}[n+1,k].\tilde{a}^*[n,k], \text{ differential demodulation}, \quad (11)$$

$$\tilde{a}_{dif\_all}[n] = \sum_{k \in T} \tilde{a}_{dif}[n, k], \quad (12)$$

use of frequency diversity (T is the set of indices of the TPS pilots), $$b[n] = \begin{cases} 1, & \Re\{\tilde{a}_{dif\_all}[n]\} \geq 0, \\ -1, & \Re\{\tilde{a}_{dif\_all}[n]\} < 0, \end{cases} \quad (13)$$

decision to obtain the TPS bit (R signifies Real part)

or carry out the differential demodulation after having used the frequency diversity. In this case, we have:

$$\tilde{a}[n] = \sum_{k \in T} \frac{\tilde{a}[n, k]}{w_k}, \quad (14)$$

use of frequency diversity (the initialization of the differential modulation is compensated for by dividing by $w_k$ which is known to the receiver), $$\hat{a}[n] = \begin{cases} 1, & \Re\{\tilde{a}[n]\} \geq 0, \\ -1, & \Re\{\tilde{a}[n]\} < 0, \end{cases} \quad (15)$$

decision, b[n]=â[n+1] â[n], differential demodulation to obtain the TPS bit (18).

Once the TPS bits have been extracted, the method retrieves the various fields making up the TPS block. The ETSI EN 300 744 standard actually describes the structure of a TPS block which commences with a differential modulation initialization bit, followed by a 16-bit synchronization word, followed by information bits (mode, modulation, value of the guard interval, etc.). It therefore suffices to scan the demodulated TPS bits until 16 consecutive bits corresponding to the 16-bit synchronization word are found, and then to refer to the standard to ascertain the meaning of the following bits. For application of a tool for identifying co-channel interferers, it may be of interest to use the field Cell_id which identifies the cell of origin of the signal.

Application of the Method in a Metrology Tool

FIG. 2 diagrammatically shows an exemplary application of the method according to the invention in a metrology tool.

The receiver suitable for implementing the method according to the invention is situated in a measurement vehicle used to transport the equipment to a point where an interference problem has been detected.

In this example the receiver comprises 5 antennas and its objective is to detect and to identify the various DVB-T transmitters received at a location in a given frequency band. This information is used for example to optimize the network or to refer same to a regulating authority.

One may for example be interested in a channel of the UHF or VHF bands. For example, by adjusting the equipment to the frequency 626 MHz (channel 40), the equipment will be able to provide the list of DVB-T signals received at this frequency and for each of the DVB-T signals received, the following information:

signal reception level,
C/I=signal to interferer ratio (the objective is to detect and to demodulate the TPS information for C/I ratios of at least up to −20 dB),
Cell-id (identification of the cell of origin of the signal),
Configuration of the DVB-T signal (mode, guard interval, modulation used, code rate, etc.).

The invention claimed is:

1. A method of demodulating a signal in a transmission system where the modulation includes several substantially orthogonal subcarriers, wherein the vector of the propagation channel H[n,k] is known, or the received signal, including at least pilot symbols transmitting reference data, the method comprising at least one step of:

estimating the symbol a[n,k] emitted on the $k^{th}$ subcarrier of the $n^{th}$ symbol of the modulation using a recombination step weighting the various signals received x[n,k] after synchronization and demodulation, wherein the recombination step uses a recombination vector defined by the relation $$g[n]=R_{xx}^{-1}[n].r_{xd}[n] \quad (3)$$

where:

$R_{xx}[n]$. is the correlation matrix of a signal to be spatially filtered; and $r_{xd}[n]$ is the vector of intercorrelation between the signal to be spatially filtered and a reference sequence; and wherein the estimation of the correlation matrix and of the intercorrelation vector is performed using the following formulae:

$$\hat{R}_{xx}[n] = \sum_{l=-L_1}^{L_2} \left( \sum_{k \in K_l} x[n+l,k] x^H[n+l,k] \right) \quad (4)$$

$$\hat{r}_{xa}[n] = \sum_{l=-L_1}^{L_2} \left( \sum_{k \in K_l} x[n+l,k] a^*[k] \right) \quad (5)$$

where:
the index 1 corresponds to the use of the symbols of the modulation before, $L_1$ symbols before, and $L_2$ symbols after the symbol considered so as to improve the estimation of the correlation matrix,
$K_l$ is the set of indices of the continuous pilots and/or of the dispersed pilots.

2. The method as claimed in claim 1, wherein it comprises a step of splitting the global band of the signal into m subbands and in that the recombination vector is determined for each subband.

3. The method as claimed in claim 1, wherein the following formulae are use to estimate the correlation matrix:

$$\hat{R}_{xx}[n,m] = \sum_{l=-L_1}^{L_2} \left( \sum_{k \in K_{l,m}} x[n+l,k] x^H[n+l,k] \right) \quad (4)a$$

$$\hat{r}_{xa}[n,m] = \sum_{l=-L_1}^{L_2} \left( \sum_{k \in K_{l,m}} x[n+l,k] a^*[k] \right) \quad (5)a$$

where $K_{l,m}$ represents the set of indices of the continuous pilots and/or of the dispersed pilots of subband m.

4. A method of demodulating a signal in a transmission system where the modulation comprises several substantially orthogonal subcarriers, the received signal including at least pilot symbols transmitting reference data, the method comprising:
a step of estimating the vector of the propagation channel H[n, k], and
at least one step of estimating the symbol a[n,k] emitted on the $k^{th}$ subcarrier of the $n^{th}$ symbol of the modulation using a recombination step weighting the various signals received x[n,k] after synchronization and demodulation, wherein the recombination step uses a recombination vector defined by the relation $$g[n] = R_{xx}^{-1}[n].H[n,k] \quad (8)$$

where:
$R_{xx}[n]$ is the correlation matrix of a signal to be spatially filtered;
wherein the estimation of the correlation matrix and of the intercorrelation vector is performed using the following formulae:

$$\hat{R}_{xx}[n] = \sum_{l=-L_1}^{L_2} \left( \sum_{k \in K_l} x[n+l,k] x^H[n+l,k] \right) \quad (4)$$

$$\hat{r}_{xa}[n] = \sum_{l=-L_1}^{L_2} \left( \sum_{k \in K_l} x[n+l,k] a^*[k] \right) \quad (5)$$

where:
the index 1 corresponds to the use of the symbols of the modulation before and after the symbol considered so as to improve the estimation of the correlation matrix,
$K_l$ is the set of indices of the continuous pilots and/or of the dispersed pilots.

5. The method as claimed in claim 4, wherein it comprises a step of splitting the global band of the signal into m subbands and in that the recombination vector is determined for each subband.

6. The method as claimed in claim 4, wherein the following formulae are used to estimate the correlation matrix:

$$\hat{R}_{xx}[n,m] = \sum_{l=-L_1}^{L_2} \left( \sum_{k \in K_{l,m}} x[n+l,k] x^H[n+l,k] \right) \quad (4)a$$

$$\hat{r}_{xa}[n,m] = \sum_{l=-L_1}^{L_2} \left( \sum_{k \in K_{l,m}} x[n+l,k] a^*[k] \right) \quad (5)a$$

where $K_{l,m}$ represents the set of indices of the continuous pilots and/or of the dispersed pilots of the subband m.

7. The method as claimed in claim 4, wherein the estimated correlation matrix is the correlation matrix of the Gaussian white noise and of the interference signals $R_{zz}[n,k]$.

8. The method as claimed in claim 1, wherein the modulation is a modulation of orthogonal frequency division modulation ("OFDM") type.

9. The method as claimed in claim 1, wherein the signal is a Digital Video Broadcasting-Terrestrial (DVB-T) signal and in that the Transmission parameter signaling ("TPS") pilot symbols are estimated.

10. The method as claimed in claim 9, wherein it comprises at least the following steps:
demodulating in a differential manner:

$$\tilde{a}_{dif}[n,k] = \tilde{a}[n+1,k].\tilde{a}^*[n,k], \quad (13)$$

using the frequency diversity:

$$\tilde{a}_{dif\_all}[n] = \sum_{k \in T} \tilde{a}_{dif}[n,k], \quad (14)$$

applying a decision criterion to obtain the TPS bit $$b[n] = \begin{cases} 1, & \mathcal{R}\{\tilde{a}_{dif\_all}[n]\} \geq 0, \\ -1, & \mathcal{R}\{\tilde{a}_{dif\_all}[n]\} < 0, \end{cases}$$

11. The method as claimed in claim 9, wherein it comprises at least the following steps:
using the frequency diversity:

$$\tilde{a}[n] = \sum_{k \in T} \frac{\tilde{a}[n,k]}{w_k},$$

applying a decision criterion:

$$\hat{a}[n] = \begin{cases} 1, & \mathcal{R}\{\tilde{a}[n]\} \geq 0, \\ -1, & \mathcal{R}\{\tilde{a}[n]\} < 0, \end{cases}$$

demodulating in a differential manner to obtain the TPS bit: $b[n] = \hat{a}[n+1]\hat{a}[n]$.

* * * * *